United States Patent [19]

Blaha et al.

[11] 4,350,983
[45] Sep. 21, 1982

[54] NAVIGATION METHOD FOR PRECISELY STEERING A FLYING OBJECT

[75] Inventors: Alfred Blaha, Haar; Hans-Juergen Schwärzler, Taufkirchen, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 21,023

[22] Filed: Mar. 16, 1979

[30] Foreign Application Priority Data

Mar. 25, 1978 [DE] Fed. Rep. of Germany ....... 2813189

[51] Int. Cl.³ ............................................. G01S 1/24
[52] U.S. Cl. ..................................... 343/103; 364/452; 244/3.19
[58] Field of Search ............... 343/103, 112 R, 5 MM; 244/3.15, 3.19; 364/452

[56] References Cited

U.S. PATENT DOCUMENTS 2,811,717 10/1957 Palmer ................................ 343/103
3,816,832 6/1974 Elwood .......................... 343/112 D
3,941,984 3/1976 Chappell et al. ................... 343/103
4,179,693 12/1979 Evans et al. ..................... 343/5 MM Primary Examiner—Theodore M. Blum
Attorney, Agent, or Firm—W. G. Fasse; D. F. Gould

[57] ABSTRACT

A flying object is precisely steered by determining the position of the flying object with the aid of a trigonometric calculation. For this purpose pulse signals emitted in synchronism from two ground stations are received by the flying object and the time difference between the two arrivals is measured. The flying object is also equipped with a clock which is synchronized with the clocks of the two ground stations. Thus, the emitting times are available in the flying object. Based on the measured time difference between the receipt of the two pulses and on the given emission time the coordinates of the actual position of the flying object are calculated. The calculated position coordinates are compared with position coordinates of a rated course stored in the airborne equipment whereby a course deviation signal is calculated. The course deviation signal is then applied to the steering mechanism of the flying object to bring the latter back onto the rated course.

6 Claims, 9 Drawing Figures

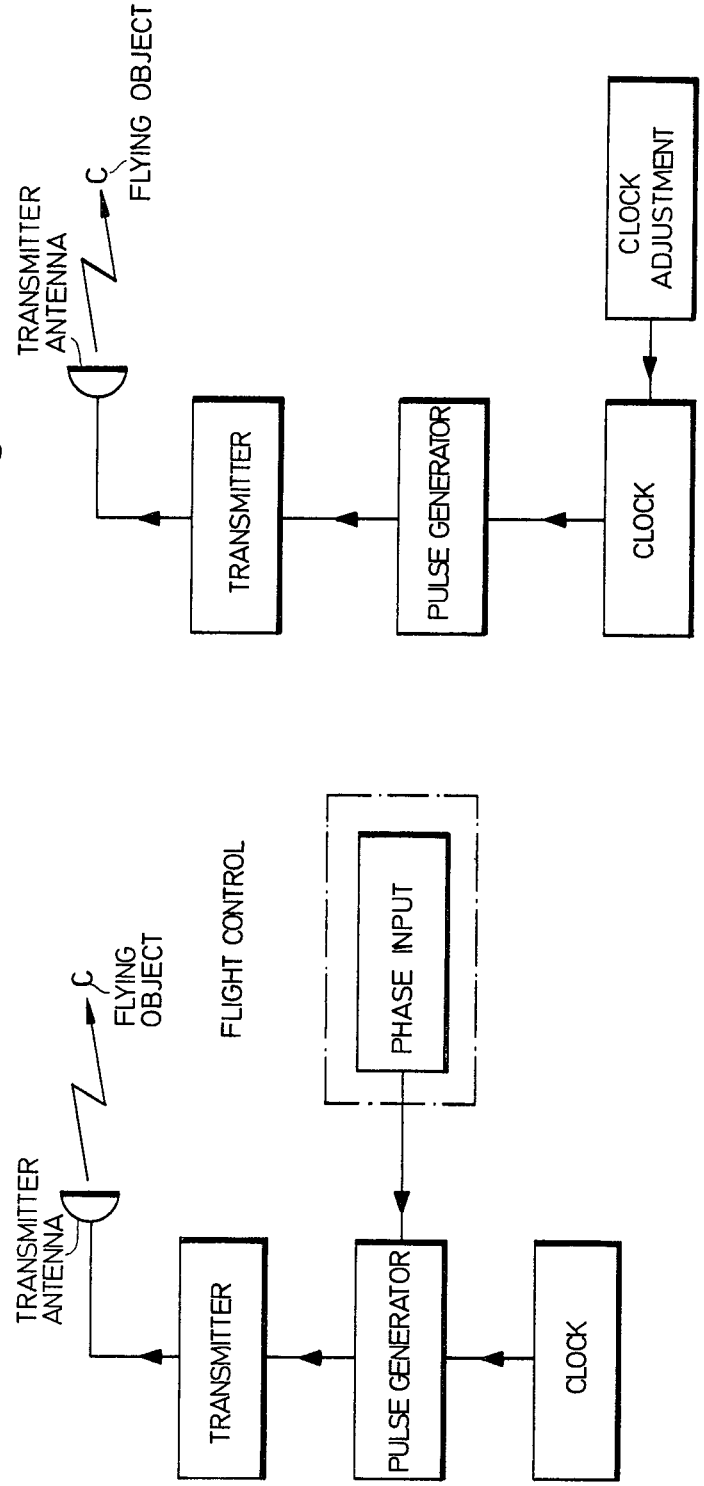

NAVIGATION METHOD FOR PRECISELY STEERING A FLYING OBJECT

BACKGROUND OF THE INVENTION

The present invention relates to a navigation method for precisely steering a flying object employing a transit time measurement and ascertaining a deviation of the flying object from a given or predetermined rated flight path or course.

Methods and devices for guiding a flying object along a predetermined course are well known in the art in many modifications. Thus, German Patent Publication (DOS) No. 2,624,821 discloses a method for guiding a flying object whereby the flying object takes a bearing relative to at least one marking on the landing surface. With the aid of such bearing taking the elevation and azimuth direction is measured. The resulting measured values are compared with given rated values relating to the landing surface. The comparing result is then used for the steering or guiding. This prior art system requires a substantial equipment expense and in addition it has the disadvantage that the flying object itself constitutes an easy target because the flying object carries pulse transmitters.

Another prior art trajectory guiding system operates in accordance with the so-called radio guidance beam. In this system the position of the aircraft or flying object relative to a radio guide beam transmitter is provided in the form of a signal representing the elevation and/or azimuth and the angular distance and such signal is received by an airborne radio beam receiver which cooperates with an analog or digital computer. The computer multiplies angular deviating signals with the angular distance or so-called slant distance or with a function of the slant distance. The angular deviation is determined relative to a straight flight path or trajectory or relative to a curved trajectory. The just mentioned prior art method intends to eliminate instabilities in the approach paths or approach profiles. However, even in this method the entire system is technically involved, and hence rather expensive. Besides, an independent approach of the landing area by the flying object is not possible in this system. Stated differently, the flying object depends on the equipment of the ground based guiding system and must operate in synchronism with the ground guiding system.

German Patent Publication (DOS) No. 2,424,159 discloses a system for guiding aircraft along an angular coordinate of a ground station. This system comprises a measuring circuit for ascertaining the angular coordinates of each aircraft by processing the signals received from an approaching aircraft. The system includes a transmitter for transmitting the signals resulting from the measurements. The transmitter includes equipment for transmitting a variable address signal which is coordinated with a binary code flagging sign signifying the words "assigned" and "available". This known system is intended to solve the problem of the so-called "take-over" of aircrafts by the control tower. However, this system also does not permit an independent approach by the aircraft. In addition, the aircraft or flying object is again an easy target because of its transmitter activity.

OBJECTS OF THE INVENTION

In view of the above it is the aim of the invention to achieve the following objects singly or in combination:

to provide a guiding and navigation method for flying objects which permits a simple and independent approach of a target, whereby the guiding must not depend on the return receipt of pulses transmitted by the flying object to the ground station;

to use synchronized clocks [$<3.10^{-11}$, par example Rhode and Schwarz XSRB or EFRATOM FRK-H] in the ground stations and on the flying object for making trigonometric measurements without any signals being transmitted by the flying object; and to provide a correction signal which represents a deviation of actual position representing coordinates from a predetermined, programmed position on a predetermined flight path or trajectory.

SUMMARY OF THE INVENTION

According to the invention there is provided that the position of the flying object is trigonometrically measured on the basis of the absolute transition time of pulses which are transmitted by two spaced transmitters at known points of time and which are received by an airborne receiver. The difference between the pulse receipt times is measured relative to distance and the position coordinates of the respective position point are calculated to ascertain the value of a deviation of the flying object from a predetermined, programmed course. The deviation representing signal is used to steer or control the autopilot.

The most important advantage of the invention is seen in that the flying object does not constitute an easy target because it does not transmit signals at all. Another advantage of the invention is seen in that the reliability is substantially increased due to the elimination of airborne transmitter equipment which simultaneously reduces the overall costs for such electronic equipment. In addition, the elimination of airborne transmitter equipment reduces the energy consumption of the entire system.

BRIEF FIGURE DESCRIPTION

In order that the invention may be clearly understood, it will now be described, by way of example, with reference to the accompanying drawings, wherein:

FIG. 7b is a block circuit diagram for a trajectory correction by means of influencing the phase position; and FIG. 7c is a block circuit diagram for the correction of the trajectory by varying the point of time at which pulses are transmitted by the ground stations.

DETAILED DESCRIPTION OF PREFERRED EXAMPLE EMBODIMENTS AND OF THE BEST MODE OF THE INVENTION

Figure 1:
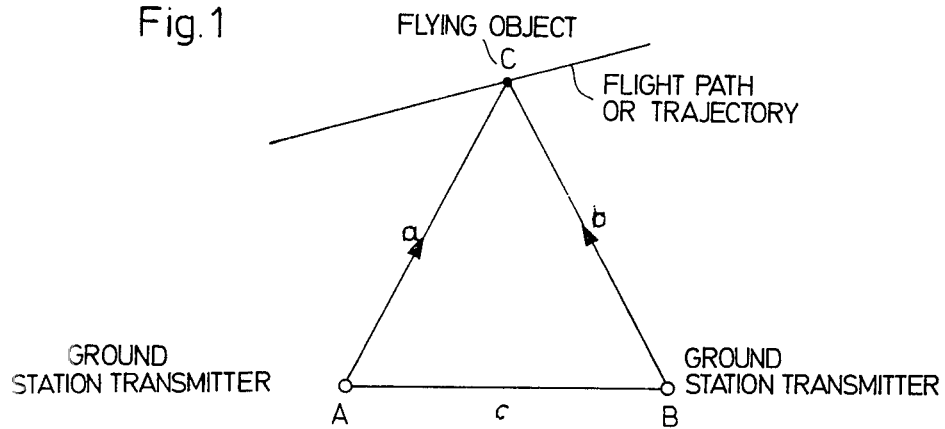
FIG. 1 is a schematic illustration of the measuring method according to the invention employing two ground stations emitting radio signals.

FIG. 1 shows two ground pulse transmitter stations A and B and the flying object C travelling along a predetermined flight path or trajectory. At the shown instant the flying object C is spaced from the ground station A by the distance "a" and from the ground station B by the distance "b". The ground stations are spaced from each other by a known, precisely determined spacing "c". The ground distance "c" is determined by conventional land measuring or surveying techniques.

The measuring method according to the invention uses a time base linking the transmitters A and B and the flying object C. Such time base is provided by high precision clocks in the transmitter stations and as part of the airborne equipment of the flying object which also carries an airborne computer which also utilizes the common time base. Since the airborne equipment, due to said common time base, knows so to speak, the transmitting time points of the stations A and B it is capable of measuring the absolute transit times of the pulses from the stations A and B to the flying object C. The pulses are transmitted by the ground stations either at known points of time or in a known time sequence. Normally the transmitted pulses are received at different times unless the distances "a" and "b" are equal to each other. The airborne computer calculates from the measured absolute transit time and from the time difference between the arrival of one pulse and the other pulse the distances "a" and "b". From these distances in turn the coordinates of the instantaneous position of the flying object C are calculated relative to a given reference coordinate system.

The absolute transit time may be measured in two different ways. Each measuring method requires its respective measuring system. In the first example embodiment the ground stations A and B and the flying object C, each is equipped with synchronized clocks whereby these clocks in the ground station control the simultaneous emission of pulses by the ground transmitters whereas the airborne clock immediately compares the received signals and passes these signals on to the airborne computer. Thus, the received signals representing the transit times for the distance "a" and the distance "b" are compared with the time base signals produced under the control of the airborne clock. There is no signal transmitted back to the ground station from the flying object. The information resulting from said comparing is directly supplied for evaluation by the airborne computer for steering or navigating the flying object.

Figure 2:
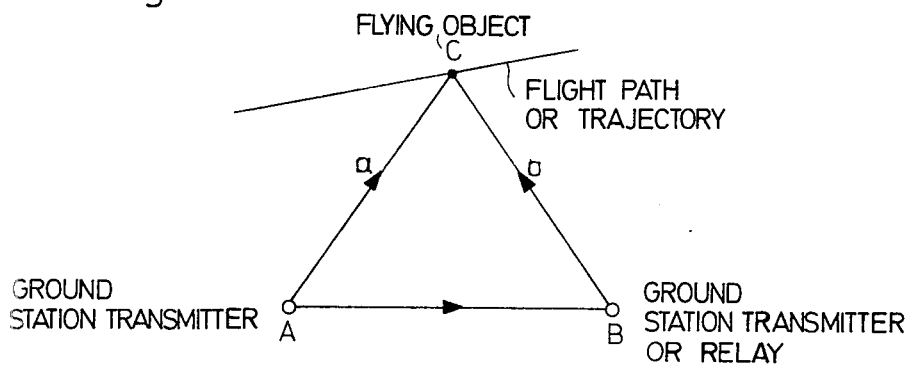
FIG. 2 is a schematic illustration employing one ground station which emits radio signals and a second ground station operating as a relay station.

In the second example embodiment illustrated in FIG. 2 one of the ground stations A and the flying object C are equipped with synchronized clocks whereas the ground station B' functions as a relay station as schematically shown in FIG. 2. In this embodiment the ground station A transmits so-called clock controlled pulses in the direction toward the flying object C and toward the relay station B. The latter relays the signals in the direction toward C. The second signal received by the receiver means in the flying object C will be delayed by an additional constant time spacing corresponding to the travel time through the fixed distance "c" between the ground station A and the relay station B'. The fixed distance "c" or the transit time corresponding to said fixed distance are programmed in the airborne computer as a given constant value.

If the airborne equipment has measured the instantaneous position of the flying object C it has ascertained the coordinates "x" and "y" whereby the airborne computer may ascertain by a simple calculation the deviation "d" of the flying object C from a given, rated or intended flight path which is stored in a memory of the airborne computer means as a course function.

Figure 3:
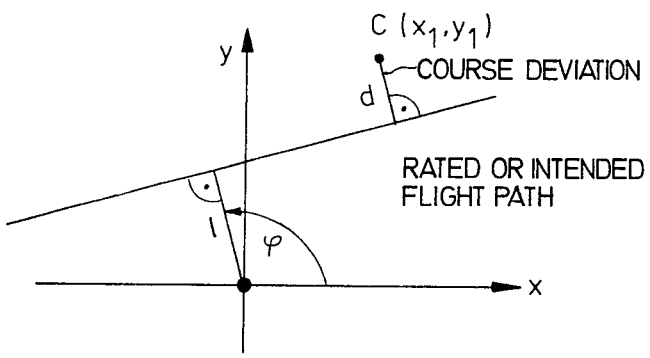
FIG. 3 is a schematic illustration of how the deviation of the flying object from a given or rated flight path or trajectory is ascertained.

FIG. 3 illustrates schematically the calculation of the deviation "d" whereby the flight path may be represented as a straight line defined by the equation:

$$x \cos \phi + y \cos \phi - 1 = 0.$$

The parameters $\phi$ and 1 are so selected that the straight line passes through the target. 1 is the nearest distance from the rated flight path to the origin of the coordinate system and $\phi$ is the angle between the horizontal and said shortest distance. The parameters $\phi$ and 1 are stored in the memory of the airborne computer as fixed values or they may be inserted into the memory prior to a flight.

The deviation "d" from the predetermined flight path is then calculated according to the following formula:

$$d = (x_1 \cdot \cos \phi + y_1 \cdot \sin \phi - 1),$$

wherein $x_1$ and $y_1$ are the coordinates of the instantaneous position of the flying object.

The deviation value "d" is continuously ascertained and at periodic time intervals and supplied as a control value to the autopilot which steers the flying object automatically toward the target. Although for simplicity's sake a straight line flight path has been used in the example, it is also possible that curved flight paths may be expressed by respective mathematical functions stored in the airborne computer memory. It is further possible to assemble a flight path from different functions, for example, including portions of straight lines and curved path sections.

Where the automatic guiding of a flight requires a flight path correction during the flight, this may be accomplished according to the invention by respective radio signals emitted from a ground guiding station or flight control center. Such insertion of flight corrections may be accomplished by reprogramming the airborne computer during the flight by means of radio signals from said flight center or the correction may be accomplished by influencing the phase position of the measured signals emitted by the transmitters A and B. A correction may also be accomplished by changing the transmitting point of time relative to the time normal or time base established by said synchronized clocks.

The method according to the invention may also be used to simultaneously navigate or control several flying objects without the need for increasing the equipment. Since each flying object flies in accordance with its own program within the coordinate system determined by the ground stations, any other flying object in the same coordinate system may be operated in accordance with its own respective program independently and autonomously relative to any other flying object in the coordinate system.

Figure 4:
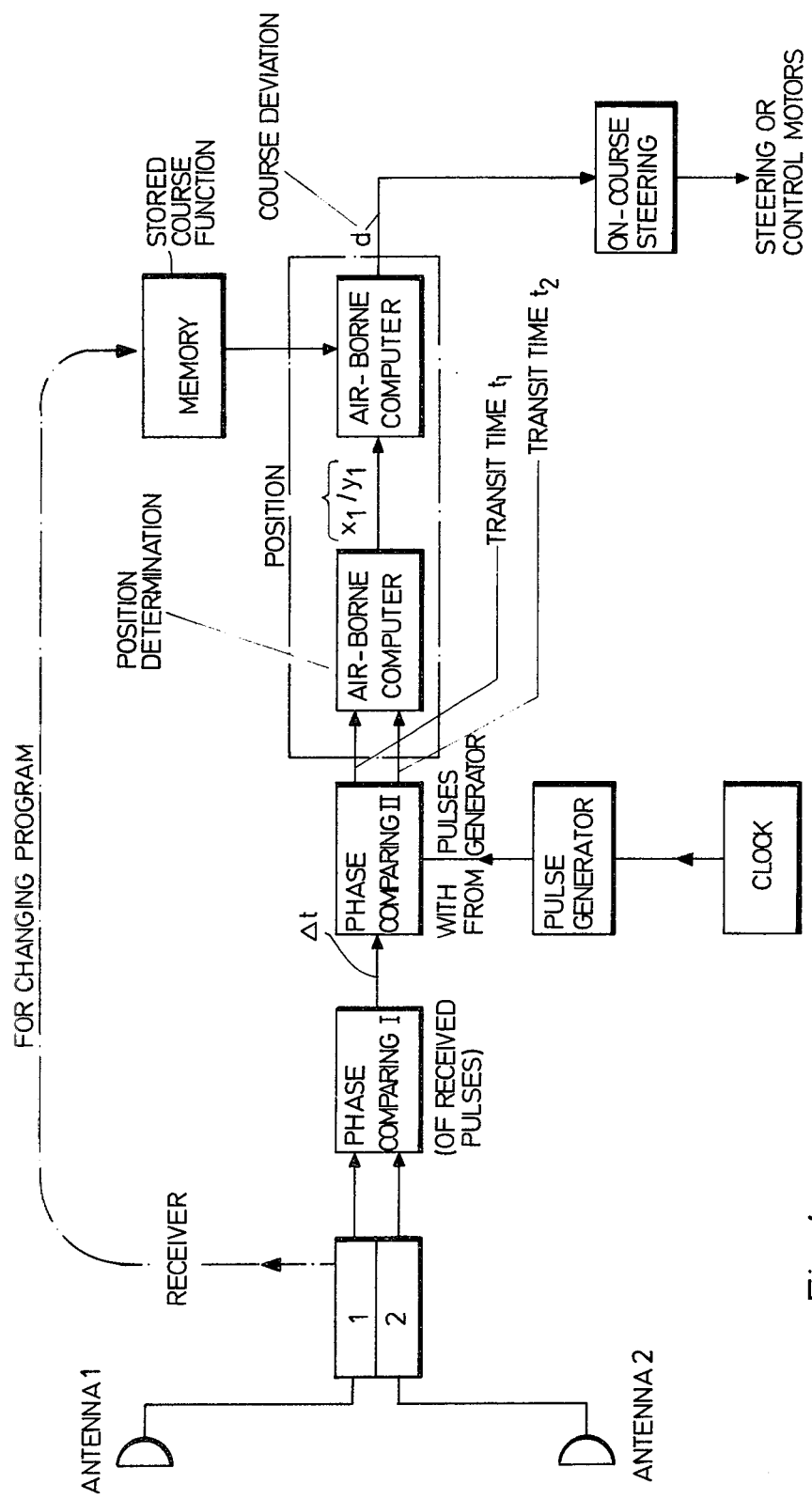
FIG. 4 is a block circuit diagram of the airborne trajectory guiding system.

FIG. 4 shows the time codes emitted from the ground stations A and B which are received by the antennas 1 and 2 from different directions and distances (compare with FIGS. 1 and 2) and transmitted to the receivers 1 and 2. Due to the fact that the two stations should have different frequencies, the need of two receivers is necessary. The demodulated time codes are transmitted to a first phase comparison separately. During this process the time difference $\Delta t$, i.e. the difference of the time between the received signals, is determined.

During the second phase comparison, the time difference $\Delta t$ is compared with the synchronized internal clock with the resulting delay times $t_1$ and $t_2$:

$t_1$ = absolute delay time of the distance A-B
$t_2$ = absolute delay time of the distance B-C.

The position coordinates $x_1$ and $y_1$ are the results of the actual positioning of the delay times in the board computer I. The board computer II computes the course failure d versus the pre-programmed course function. When the actual position ($x_1$, $y_1$) has the same value as the pre-programmed course function in this point, the course failure $d=0$. In case of positive or negative course failures the flying object is right or left of the required flight path. The magnitude of the course failure is then a signal for the automatic flight control system.

The dotted line from receiver 1 to the stored course function shall indicate that the programme can be changed by data link.

The foregoing feature of the invention that a plurality of flying objects may be guided independently of each other in the same coordinate system has the distinct advantage over the prior art that multiplexing equipment has been obviated altogether.

The flight control and navigation method according to the invention provides a simple and autonomous target approach while simultaneously operating any desired number of flying objects. The flight control itself requires no return pulse signals from the flying object to the ground station. Since the flying object does not itself emit any signals for navigational purposes, it has the advantage that detection is made substantially more difficult which is especially important for military flying objects.

Figure 5:
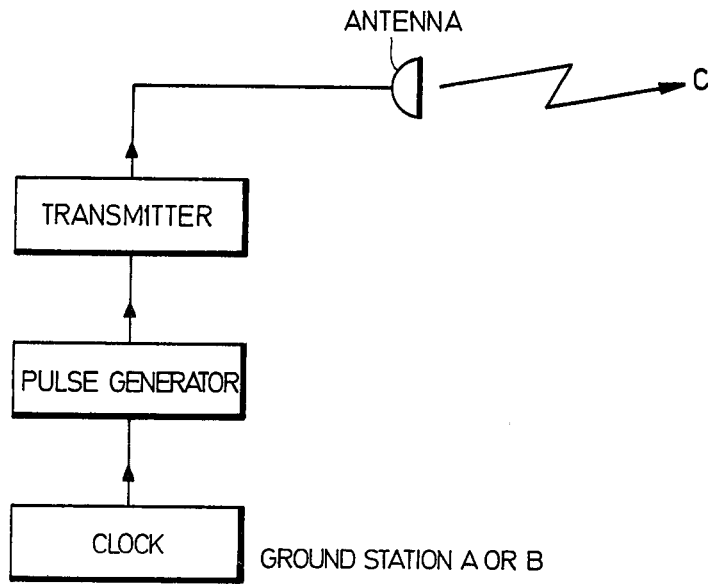
FIG. 5 is a block diagram of the transmitter system of both ground stations.
Figure 6:
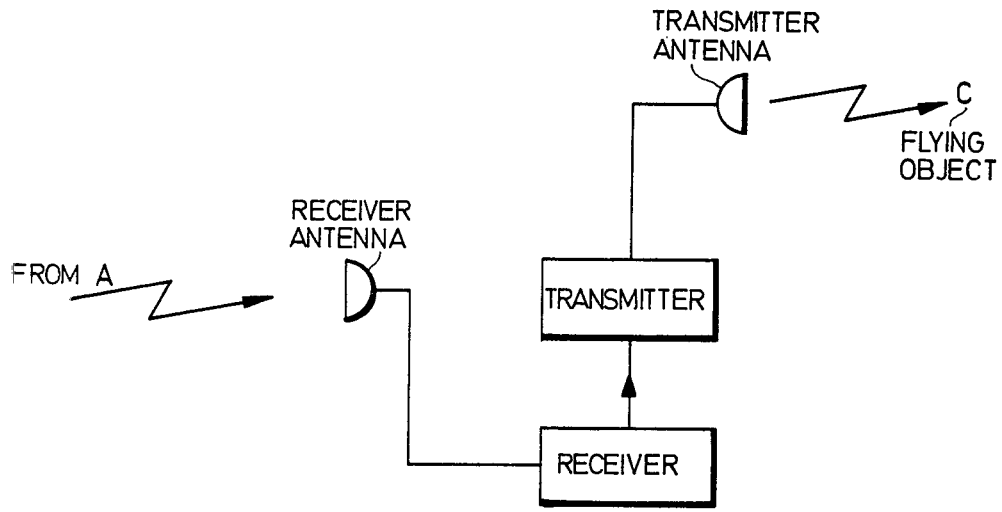
FIG. 6 is a block circuit diagram of a ground station operating as a relay station.
Figure 7A:
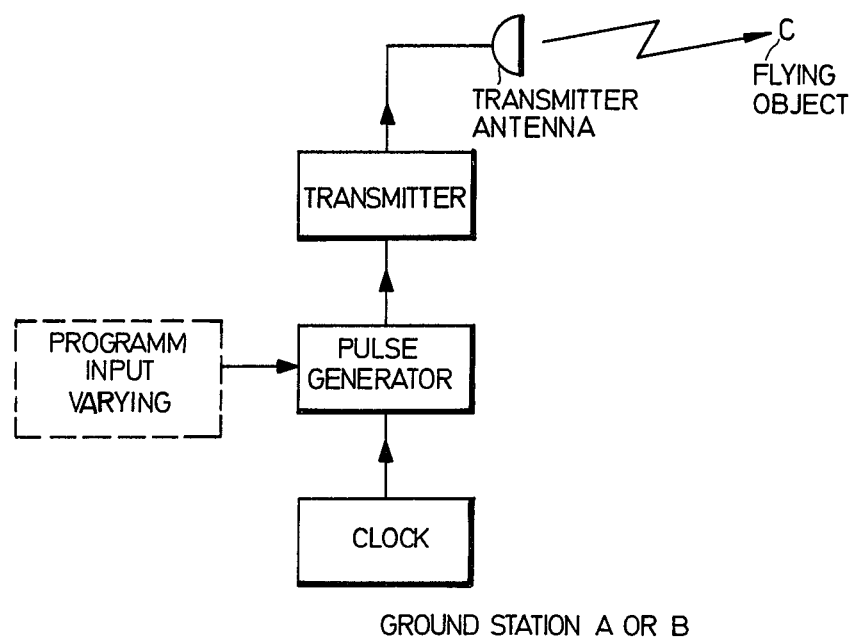
FIG. 7a illustrates a block circuit diagram for a program modification.

The block diagrams of FIGS. 4, 5, and 6 as well as 7 are relatively self explanatory. FIG. 4 shows an example of the airborne equipment whereas FIG. 5 illustrates the equipment in the ground stations A and B. FIG. 6 illustrates the equipment of the ground relay station B' for relaying the signals received from the ground station A. FIG. 7a illustrates a modification for varying a program in any of the ground stations A and/or B. FIG. 7b illustrates a flight path correction by modifying the phase position of impulses generated in the ground station. FIG. 7c illustrates a flight path correction by adjusting the time base clock.

Although the invention has been described with reference to specific example embodiments it will be appreciated, that it is intended to cover all modifications and equivalents within the scope of the appended claims.

What is claimed is:

1. A method for navigating a flying object, comprising the steps of establishing at least two ground based pulse transmitter stations at a given distance from each other, providing the flying object with airborne pulse receiver means, providing each of said ground based pulse transmitter stations and said airborne pulse receiver means of said flying object with a respective high precision clock, said high precision clocks having a common time base for said ground based transmitter stations and for said airborne pulse receiver means of said flying object, transmitting simultaneously and at predetermined points of time as controlled by said high precision clocks in the ground based pulse transmitter stations, pairs of pulse signals from said ground stations to said airborne pulse receiver means in such a manner that one pulse signal of a received pulse pair is transmitted by one ground based pulse transmitter station while the other pulse signal of the same received pulse pair is transmitted by the other ground based pulse transmitter station, said airborne high precision clock making said predetermined transmitting time points available in said flying object in the form of time base signals, measuring the time difference ($\Delta t$) between the receipts of two pulses forming said received pulse pair of pulse signals by ascertaining in a first comparing step (Phase Comparing I) the phase difference between the pulse signals forming said received pulse pair, measuring the absolute transit times ($t_1$ and $t_2$) of the pulse signals of a received pulse pair from said ground based transmitter stations to said airborne pulse receiver means by performing a second comparing step (Phase Comparing II) in which said time difference ($\Delta t$) between the pulses of a received pulse pair is compared with said time base signals from said airborne high precision clock, trigonometrically calculating from said absolute transit times ($t_1$ and $t_2$) and from said time difference ($\Delta t$) the instantaneous distances of said flying object from each of said ground based stations, determining from said distances the instantaneous position coordinates of said flying object, comparing in a third comparing step said instantaneous position coordinates with a rated course function stored in respective memory means in said flying object to produce a course deviation signal (d), and supplying said course deviation signal (d) to airborne autopilot means.

2. The method of claim 1, comprising operating one of the ground stations as a primary transmitter and operating the other ground station as a relay station.

3. The method of claim 1, wherein said course deviation signal is determined repeatedly and respectively supplied to said autopilot means as a control signal.

4. The method of claim 1, comprising providing said flying object with airborne computer means and reprogramming said airborne computer means by radio signals from a ground based guiding station while said flying object is airborne.

5. The method of claim 1, further comprising making course corrections during flight by modifying the phase position of the pulses emitted by the ground pulse transmitter stations relative to said common time base.

6. The method of claim 1, further comprising making course corrections during flight by changing the transmitting time points in said ground pulse transmitter stations relative to said common time base.

* * * * *